Dec. 9, 1958 M. INGRAM 2,863,340
COMBINATION PILOT AND COUNTERSINK DRILL
Filed June 11, 1956

MAXWELL INGRAM
*INVENTOR.*

BY

United States Patent Office 2,863,340
Patented Dec. 9, 1958

2,863,340

COMBINATION PILOT AND COUNTERSINK DRILL

Maxwell Ingram, Dumont, N. J.

Application June 11, 1956, Serial No. 590,448

1 Claim. (Cl. 77—66)

This invention relates to combination pilot and countersink drills.

An object of this invention is to provide a pilot and countersink drill which, when used to prepare material to receive screws, will prevent the deformation of the slots in the screws, the breaking of the screws, the stripping of the screw threads, or the splitting or deforming of the material receiving the screws.

It is a further object of this invention to provide a combination pilot and countersink drill which will facilitate the accurate driving of screws and achieve the maximum holding power between the screws and the material in which they are inserted.

A still further object of this invention is to provide a combination pilot and countersink drill which can be used in a wide variety of drills such as hand drills, portable electric drills, drill presses, and production machinery either to countersink or to counterbore to an indicated depth without any adjustment or the removal of the combination pilot and countersink drill from the tool in which it is being used.

Another object of this invention is to provide a combination pilot and countersink drill that can be adjusted to pre-drill holes for screws of different lengths.

An additional object of this invention is to provide a combination pilot and countersink drill that incorporates and utilizes a standard drill bit.

Additional objects, advantages and features of invention reside in the construction, arrangement and combination of parts involved in the embodiment of the invention and its practice as will be understood from the following description and accompanying drawings wherein.

Figure 1:
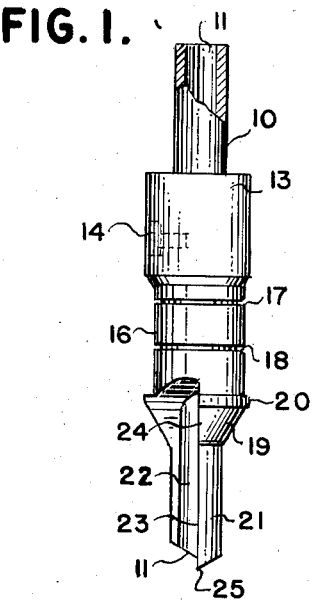
Figure 1 is an elevational view of the combination pilot and countersink drill shown partly in longitudinally section.

As shown in Figure 1, the device comprises a generally cylindrical body including a shank portion 10 which may be engaged by any standard drill chuck or other holding means. Concentric with and through said shank portion there extends the channel 11 which is advantageously of circular cross-section and is adapted to receive a standard twist drill bit 12. Also concentric with and extending directly from said shank portion is a cylindrical collar 13 provided with threaded recess 14 adapted to receive a set screw 15. Below said collar there extends a counterbore shaft 16 which preferably bears depth indicating marks 17 and 18. In this embodiment of the invention, said depth indicating marks are cut into said counterbore shaft and disposed one above the other.

Below said counterbore shaft there is provided a generally conical countersink element 19 which includes a small cylindrical portion 20. Below said countersink element is the shank clearance drilling element 21. Said counterbore shaft, said countersink element, said shank clearance drilling element are concentric with respect to the channel 11. A vertical slot 22 is cut from the lower portion of said shank clearance drilling element through said shank clearance drilling element, through said countersink element and into said counterbore shaft. Said vertical slot has one cutting edge 23 which is in a plane extending through the center of the channel 11.

The countersink element 19, which is of generally conical form is slightly spiralled outward to the countersink cutting edge 24 to enable said countersink cutting edge to engage the material being drilled 26 and to allow said countersink cutting edge a slight clearance angle. The lower end of the shank clearance drilling element 21 also spirals upward from the shank clearance cutting edge 25 so that said shank clearance cutting edge will have a clearance angle and engage the material being drilled.

In operation, this adjustable combination pilot and countersink drill may be used as follows. The shank portion 10 is fixed in the holding means of a drilling machine such as the chuck on a portable electric drill. However, if it is considered desirable for any reason, the shank of the standard twist drill bit 12 may be fixed in the drilling machine. As the rotating combination pilot and countersink drill is brought into contact with the material being drilled, the standard twist drill bit 12 enters the material drilling a pilot hole until the shank clearance cutting edge 25 comes into contact with the material. Then a smaller pilot hole and a larger shank clearance hole are drilled simultaneously. If the drilling operation is stopped at this point, a superior pilot hole has been drilled with shank clearance for the seating of a round head screw or the like.

Figure 2:
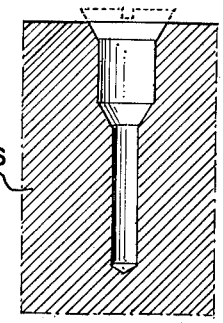
Figure 2 is a longitudinal section through material prepared to receive a screw by the combination pilot and countersink drill.
Figure 4:
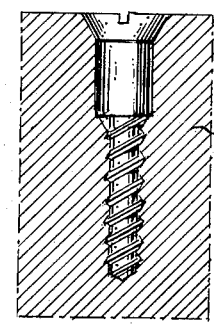
Figure 4 is a longitudinal section through material prepared to receive a screw by the combination pilot and countersink drill with a flat head screw shown in a countersunk position.
Figure 5:
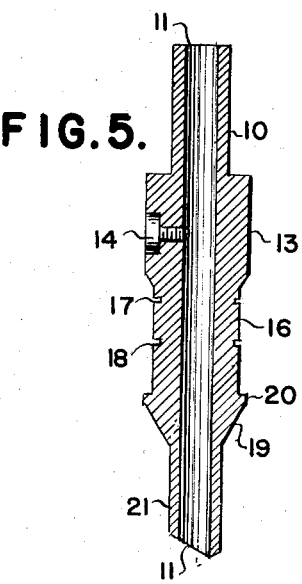
Figure 5 is a longitudinal section of the device shown in Figure 1.
Figure 6:
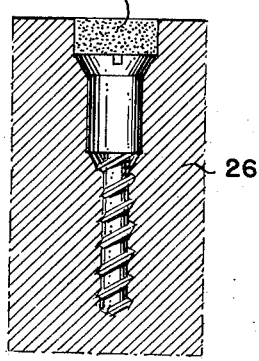
Figure 6 is a longitudinal section through material prepared to receive a screw by the combination pilot and countersink drill with a flat head screw shown in a counterbored position.
Figure 3:
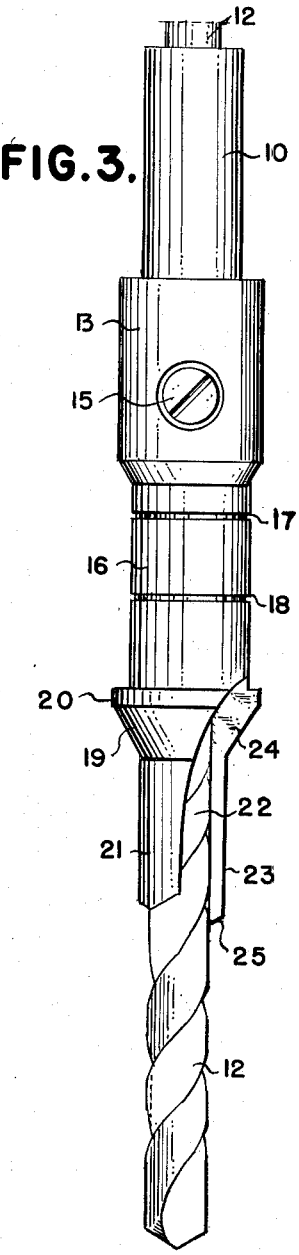
Figure 3 is an elevational view of the combination pilot and countersink drill on an enlarged scale.

If the drilling operation is continued until the countersink cutting edge 24 comes into contact with the material, a combination pilot hole, shank clearance and countersink may be drilled in one operation to any depth desired as shown in Figure 2, and Figure 4. If the drilling is further continued, a combination pilot hole, shank clearance, countersink and counterbore may be drilled in one operation as shown in Figure 6. The indicating marks 17 and 18 on the counterbore shaft 16 may be used to visually determine when the counterbore is deep enough to enable a screw head to be concealed by a plug 28. The four preparations, pilot hole, pilot hole with shank clearance, pilot hole with shank clearance and countersink, and pilot hole with shank clearance, countersink and counterbore, may all be made using this combination pilot and countersink drill without removing it from the drilling machine or adjusting it in any way.

If screws of different lengths are to be used, the set screw 15 may be loosened and the standard twist drill bit 12 may be moved up or down to drill a longer or shorter pilot hole for any of the great variety of preparations mentioned above. This adjustment may be made without removing the combination pilot and twist drill from the holding means of the drilling machine. Also said standard twist drill bit may be easily replaced when dulled or broken thus greatly prolonging the life of the combination pilot and countersink drill. It may be desirable to grind a small flat on one side of the standard twist drill bit to enable the set screw 15 to more firmly engage said drill bit. The tool may be readily used to prepare wood, plastic, fibers, metals and other materials to receive screws.

If special drill bits are to be used to practice this invention that are not round in cross-section, the channel 11 may be formed to accommodate such drill bits. The elements that have been shown in cylindrical form may be modified. For example the shank portion 10 could be made in a standard taper such as a Morse taper. Other parts could be square or hexagonal. There could be more than one vertical slot 22 if it is desirable to have more than one countersink cutting edge 24 or more than one shank clearance cutting edge 25. The angles at which the cutting edges are placed may be varied to prepare material to receive other than standard screws.

I have shown and described a preferred embodiment of my invention. It will be apparent, however, that this invention is not limited to this embodiment, and that many changes, additions and modifications can be made in connection therewith without departing from the spirit and scope of the invention as herein disclosed and hereinafter claimed.

Having described my invention, what I claim as new and desire to secure by Letters Patent is:

A combination pilot hole, shank clearance, countersink and counterbore drill comprising a generally cylindrical body provided with a channel of circular cross-section extending therethrough adapted to receive a drill bit and including a shank portion at the upper end of said cylindrical body adapted to be received within the chuck of a drilling machine for securement therein during the operation thereof, a cylindrical collar disposed below said shank portion and concentric therewith, said cylindrical collar being provided with a threaded recess extending radially through said collar, a set screen disposed within said recess for engagement with the shank of said drill, a counterbore shaft portion disposed below said collar, said shaft portion being of smaller diameter than said collar portion and being provided with circumferential grooves at axially spaced intervals forming depth indicia therefor, a small cylindrical portion of larger diameter than said counterbore shaft disposed below said shaft and a generally conical countersink element disposed below said cylindrical portion, a cylindrical clearance drilling element disposed at the frustum of said conical countersink element, said counterbore shaft, countersink element and shank clearance drilling element being concentric with respect to said channel and having a vertical slot, one wall of said slot comprising a cutting edge extending in a plane through the center of said channel and the other wall of said slot being spirally disposed with respect to said channel, said slot extending into said counterbore shaft.

References Cited in the file of this patent

UNITED STATES PATENTS

| | | |
|---|---|---|
| 267,590 | Ravenaugh | Nov. 14, 1882 |
| 1,387,994 | Lewis | Aug. 16, 1921 |
| 1,392,960 | Mizzell | Oct. 11, 1921 |
| 2,555,746 | Horsky et al. | June 5, 1951 |

FOREIGN PATENTS

| | | |
|---|---|---|
| 684,634 | France | Mar. 18, 1930 |